Figure 1:
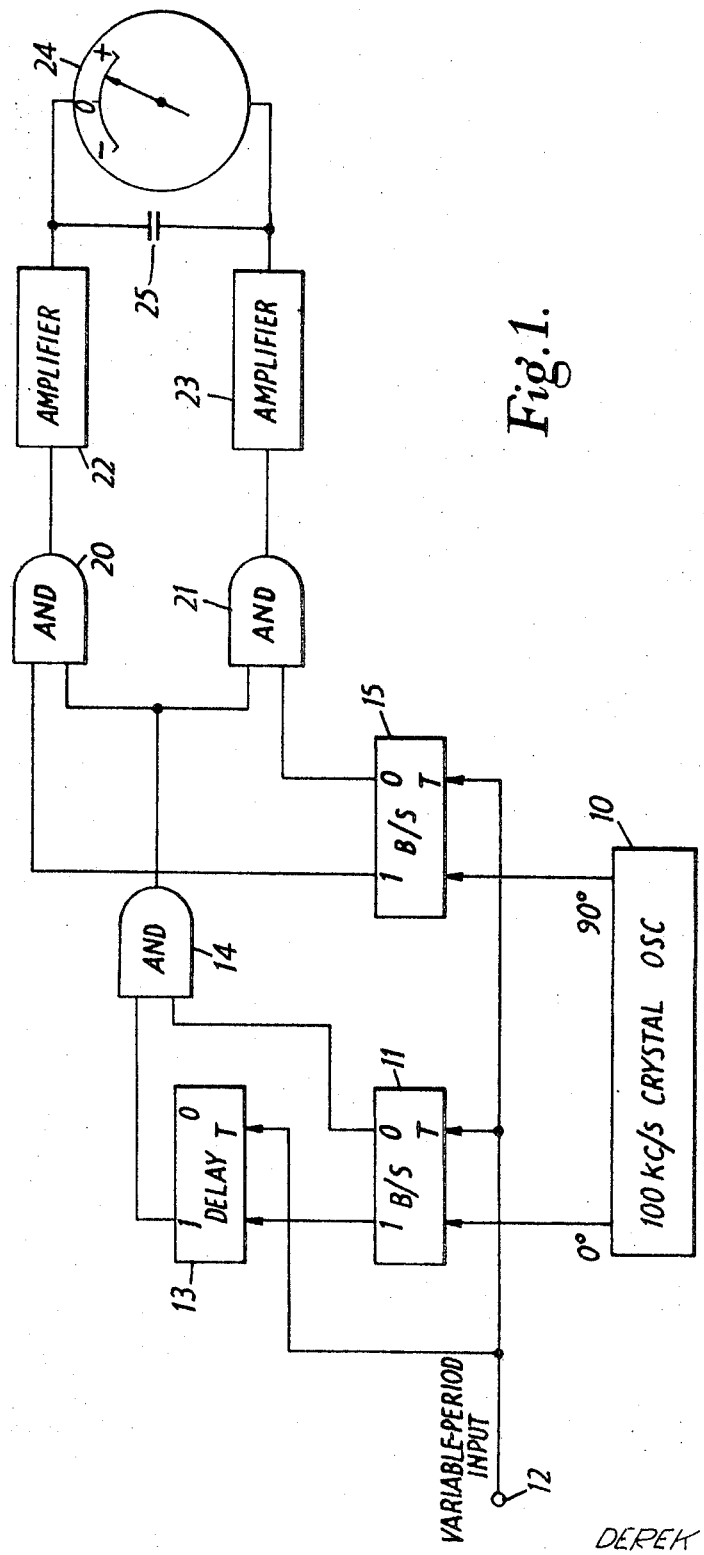

United States Patent

[11] 3,585,508

| [72] | Inventor | Derek N. Crowther |
| --- | --- | --- |
| | | Edgware, England |
| [21] | Appl. No. | 778,251 |
| [22] | Filed | Nov. 22, 1968 |
| [45] | Patented | June 15, 1971 |
| [73] | Assignee | G. & E. Bradley Limited |
| | | London, England |
| [32] | Priority | Nov. 24, 1967 |
| [33] | | Great Britain |
| [31] | | 53664/67 |

[54] CIRCUIT FOR DETERMINING THE DIFFERENCE BETWEEN A FIXED AND UNKNOWN FREQUENCY
10 Claims, 2 Drawing Figs.

[52] U.S. Cl.................................................. 328/134,
324/78, 328/58, 328/141
[51] Int. Cl..................................................... H03k 9/06
[50] Field of Search.......................................... 328/134,
58, 141, 136, 133; 307/233, 265, 295; 324/78 Q,
78 E, 78 I

[56] References Cited
UNITED STATES PATENTS

| 3,058,063 | 10/1962 | Sher | 328/134 X |
| --- | --- | --- | --- |
| 3,235,800 | 2/1966 | Turrell | 328/134 X |
| 3,244,959 | 4/1966 | Thompson et al. | 324/78 E UX |
| 3,314,014 | 4/1967 | Perkins | 328/134 |
| 3,430,149 | 2/1969 | Williams | 307/233 X |

*Primary Examiner*—Stanley T. Krawczewicz
*Attorney*—Woodhams, Blanchard and Flynn ABSTRACT: Determination of the fractional difference between the periods of an input signal and a standard signal is effected by forming a difference signal the frequency of which is equal to the difference between the frequencies of the input and standard signals, and generating an output signal consisting of one or more cycles of the input signal for each cycle of the difference signal, whereby the mean value of the output signal is proportional to the percentage period difference.

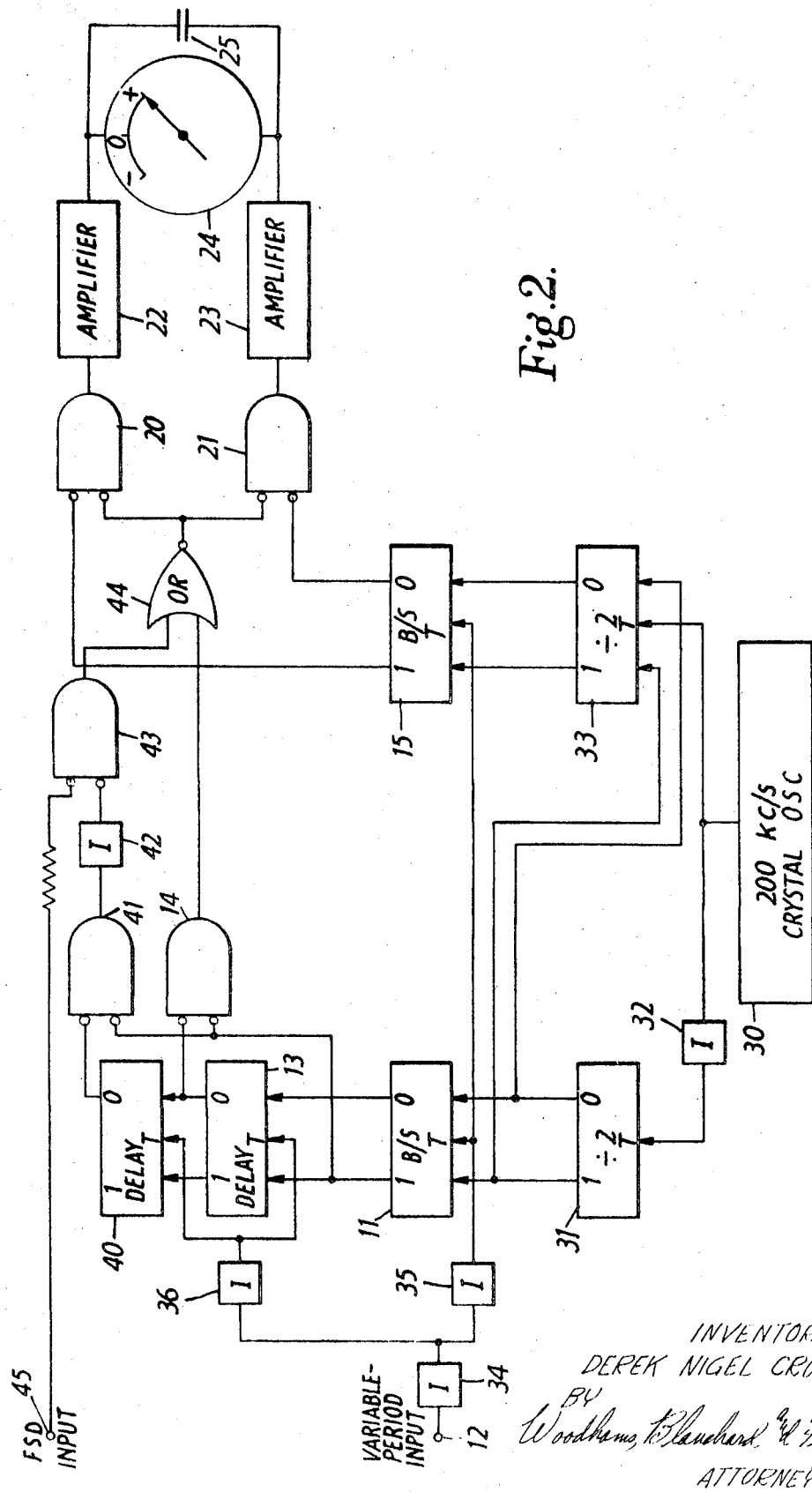

CIRCUIT FOR DETERMINING THE DIFFERENCE BETWEEN A FIXED AND UNKNOWN FREQUENCY

This invention relates to the determination of the fractional difference between the period of an oscillation and a standard period.

According to one aspect of the invention there is provided a method of generating an electrical output signal representative of the fractional difference in the period of an input signal from a standard period, the method comprising the steps of generating a standard signal having the standard period, forming a difference signal the frequency of which is equal to the difference between the frequencies of the input and standard signals, and generating from the difference signal, a signal being the output signal consisting of a predetermined number of cycles of the input signal for each cycle of the difference signal In a preferred form of this aspect of the invention the output signal is generated from the difference signal by delaying the difference signal by the predetermined number of cycles of the input signal to provide a delayed signal, and applying the difference and delayed signals to a gate to form the output signal.

Preferably the difference signal is generated by sampling the standard signal once per cycle of the input signal and holding each sampled value until the next succeeding sample.

In another form of this aspect of the invention the method further comprises the steps of forming a second difference signal differing in phase from the first difference signal and generating a second output signal from the second difference signal having a polarity dependent of the sense of the difference between the period of the input signal and the standard period.

According to another aspect of the invention there is provided apparatus for generating an electrical output signal representative of the fractional difference in the period of an input signal from a standard period, the apparatus comprising a generator for generating a standard signal having the standard period, a frequency-subtractor connected to the generator and to an input terminal for forming a difference signal the frequency of which is equal to the difference between the frequencies of the input and standard signals, and output-signal-generating means for generating from the difference signal a signal being the output signal consisting of a predetermined number of cycles of the input signal for each cycle of the difference signal.

In a preferred form of this aspect of the invention the output-signal-generating means comprises a delay device, which, in use, delays the difference signal by the predetermined number of cycles of the input signal to provide a delayed signal, and a gate for receiving the difference and delayed signals and forming the output signal.

Preferably the subtractor comprises a clocked bistable, which, in use, samples the standard signal once per cycle of the input signal and holds each sampled value until the next succeeding sample.

In another form of this aspect of the invention the apparatus further comprises a second subtractor for forming a second difference signal differing in phase from the first difference signal, and switching means for switching the output signal in accordance with the polarity of the second difference signal in such a manner that the sense of the fractional difference in the period of the input signal is indicated. Two embodiments of the invention will now be described, by way of example, with reference to the accompanying drawings, in which:

FIG. 1 shows in block schematic form apparatus forming a first embodiment of the invention; and FIG. 2 shows in block schematic form apparatus forming a second embodiment of the invention.

The apparatus shown in FIG. 1 has a generator 10 in the form of a 100 kc./s. crystal oscillator, which generates at a first output a square wave standard signal which defines a phase angle of 0°. A bistable 11 is connected to the first output of the generator 10 and is triggered by a square wave input signal received at an input terminal 12. When it receives the leading edge of each cycle of the input signal, the bistable 11 supplies at an output 1 a signal which is the signal which it receives at that instant from the generator 10. The signal on the output 1 retains this value for a complete cycle of the input signal. The bistable 11 also provides at an output O a signal which is the inverse of the signal at its output 1.

A delay device 13 and an AND gate 14 together generate the output signal. The delay device 13 is a bistable which is triggered by the input signal and supplies at an output 1 a signal which is the signal from the output 1 of the bistable 11 delayed by one cycle of the input signal. The AND gate 14 is connected to the output 1 of the delay device 13 and the output O of the bistable 11.

A bistable 15 is connected to a second output of the generator 10. The signal on the second output of the generator is the same as the signal on the first output except that it is arranged to be delayed by 90°. Bistable 15 is connected to the input 12 like the bistable 11 which operates in a like manner.

An AND gate 20 is connected to the output of the AND gate 14 and to the output 1 of the bistable 15. An AND gate 21 is connected to the output of the AND gate 14 and to the output O of the bistable 15. Two amplifiers 22 and 23 are connected respectively to the AND gate 20 and 21, and a capacitor 25, a meter 24 are connected across the outputs of the amplifiers 22 and 23.

In operation, the signal $X_o$ of the standard frequency of 100 kc./s., is sampled in the bistable 11 once per cycle of the input signal, in fact on each leading edge of the input signal. If the input signal V were to be of the same frequency as the signal $X_o$, then the outputs of the bistable 11 would be constant. However, if the frequency of the input signal V is slightly different from the frequency of the generator 10, then the signal on the output 1 of the bistable 11 will be a difference signal $D_0$, the frequency of which is equal to the difference between the frequencies of the input and standard frequencies. The signal on the output O of the bistable may be called the signal $\bar{D}_0$ $(=D_{180})$.

The difference signal $D_0$ is applied to the delay bistable 13, and the output $D'_0$ of the bistable 13 will be the same as $D_0$ but delayed for one input-signal period. This signal, together with $\bar{D}_0$ are applied to the AND gate 14.

If, for example, the value of $D_0$ changes from 1 to 0 at the beginning of a particular cycle of the input signal, the value of $\bar{D}_0$ will change from 0 to 1 at the same time. The signal $D'_0$ will change from 1 to 0 one cycle later, and thus both the signals $D'_0$ and $\bar{D}_0$ will have a value 1 for the intervening cycle of the input signal. For this cycle a signal will appear at the output of the AND gate 14.

When the value of $D_0$ changes from 0 to 1, both $D'_0$ and $\bar{D}_0$ will be 0 for one cycle, but this will not provide an output from the gate 14. Thus it can be seen that for each cycle of the difference signal $D_0$, the output signal P from the AND gate 14 consists of one cycle of the input signal. If the output from the AND gate 14 were to be averaged, the resultant would be a measure of the fractional deviation of the period from the standard period.

It is important to note that the pulses forming the signal P are not of constant width, but are of width equal to one period of the input signal. If they were of constant width the average value of the pulses <P> would be given by $$<P> \alpha\ fv - fx$$

where $T_v$ is the period of the input signal, $$\therefore <P> \alpha \left(\frac{1}{T_v} - \frac{1}{T_x}\right) T_v = \frac{T_x - T_v}{T_v}$$

$$\therefore <P> \alpha\ \frac{\Delta T}{T_x}$$

Thus, <P> is proportional to the fractional difference in period from the standard period $T_x$.

However the signal P does not in this form provide any indication of the sense of the deviation, since the difference $D_0$ will still go from 1 to 0 once per cycle, although it will be at a different point in the cycle The bistable 15 receives an input signal $X_{90}$ from the second output of the generator 10. In exactly the same way as the bistable 11, it forms a difference signal $D_{90}$ at its output 1, and a signal $\bar{D}_{90}$ at its output O. The signal $D_{90}$ is simply related to the signal $D_0$. When $Tx<Tv$, $D_0$ is approximately 90° ahead of $D_{90}$, and when $Tx>Tv$, $D_0$ is approximately 90° behind $D_{90}$. When $Tx<Tv$ and $D_0$ goes from 1 to 0, $D_{90}$ has the value 0 since it will have changed to 0, 90° earlier. It will be appreciated that the phase difference between the first and second outputs of the generator 10 need not be 90°, but it must be sufficiently far away from 0° and 180° for an output pulse to be generated by the AND gate 14 without $D_{90}$ changing during the period of the pulse The signals $D_{90}$ and $\bar{D}_{90}$ generated by the bistable 15 are applied respectively to two AND gate 20 and 21. The output of the gate 14 is thus switched either through AND gate 20 or AND gate 21 depending on whether $Tx<Tv$ or $Tx>Tv$. In either case the signal P is amplified in amplifier 22 or amplifier 23, averaged by the capacitor 25, and applied in opposite senses to the meter 24. The meter 24 thus gives a direct reading of the sense and magnitude of the fractional deviation of the input-signal period from the standard period.

The apparatus shown in FIG. 2 is based on that shown in FIG. 1, and, where appropriate, similar parts have been given the same reference numerals. The generator 10 of FIG. 1 is replaced by a 200 kc./s. generator 30 which supplies a bistable 31 through an inverter 32. The bistable 31 divides the frequency by 2 and provides signals $Xo$ and $\bar{X}o$ at outputs 1 and O respectively. The signal $xo$ and $\bar{x}o$ are applied to a bistable 33 which can be identical to the bistable 11 of FIG. 1 and samples the signals $Xo$ and $\bar{X}o$ in accordance with the signal from the oscillator 30. Since there is no inverter between the oscillator 30 and the bistable 33, the signals $Xo$ and $\bar{X}o$ are sampled a half-period of the oscillator frequency (200 kc./s.) after the beginning of a cycle of $Xo$, and thus the output of the bistable 33 is a quarter-period at the frequency 100 kc./s. behind $Xo$. Thus the output $X_{90}$ from the output 1 of the bistable 33 is 90° behind $Xo$, and $\bar{X}_{90}$ is 90° behind $\bar{X}o$.

The bistables 11, 13 and 15 are like those shown in FIG. 1, and operate in a like manner. In FIG. 2 the duplicate connections between, for example the O output of bistable 11 and the complementary input of bistable 13, are also shown. The duplicate connections are required because the bistables used are of the J—K type. Three inverters 34, 35 and 36 are included between the input terminal 12 and the bistables to satisfy the 'loading rules' which apply.

The apparatus shown in FIG. 2 also includes means for altering the full-scale deflection of the meter. This consists of a second delay bistable 40, a gate 41, an inverter 42, a gate 43 and an OR gate 44. The AND gate 14, 20, 21, 41 and 43 shown in FIG. 2 are similar to the AND gate 14, 20 and 21 shown in FIG. 1, except that the gates shown in FIG. 1 provide an output only when both inputs are 1, and the gates shown in FIG. 2 provide an output only when both inputs are 0.

The delay bistable 40 operates in the same manner as the bistable 13 to provide delayed signals $D''_0$ and $\bar{D}''_0$. The signal $\bar{D}''_0$ is combined with $D_0$ in the AND gate 41 and thus provides at the output of the AND gate 41 a pulse of two input-signal periods each time the signal $D_0$ changes from 1 to 0. The output from the AND gate 41 is applied through the inverter 42, to obtain the correct polarity to the AND gate 43. The other input to the gate 43 is a control input from an input terminal 45 which is 1 when a full-scale deflection for a frequency deviation of, say, 10 percent is required and 0 when a frequency deviation of 5 percent is desired to produce full-scale deflection of the meter 24.

When the control input on the terminal 45 has a signal 1, the output from the AND gate 43 is 0 and the output signal P from the OR gate 44 is the output from the AND gate 14 (but inverted).

When the control input has a signal 0, the output from the AND gate 14 and 43 are both applied to the OR gate 44. The output of AND gate 14 consists of a pulse of one input-signal period and the output of AND gate 43 consists of a pulse of two input-signal periods, and the first half of the pulse is concurrent with the pulse from AND gate 14. Thus the output of the OR gate 44 is a single pulse of two input-signal period lengths duration. Thus the full-scale deflection of the meter occurs for half the frequency deviation, i.e. 5 percent instead of 10 percent.

I claim:

1. A method of determining the fractional difference in the period of an input signal from a standard period, the method comprising the steps of:

generating a standard signal having said standard period;

forming a difference signal the frequency of which is equal to the difference between the frequencies of the input and standard signals; and generating from said difference signal a signal which is the output signal comprising a pulse the duration of which is equal to a predetermined number of cycles of said input signal for each cycle of said difference signal.

2. A method according to claim 1, wherein said step of generating said output signal comprises:

delaying said difference signal by said predetermined number of cycles of said input signal to provide a delayed signal; and applying said difference and said delayed signals to a coincidence gate to form said output signal.

3. A method according to claim 1, wherein said step of forming said difference signal comprises sampling said standard signal once per cycle of said input signal and holding each sampled value until the next succeeding sample.

4. A method according to claim 1, wherein the method further comprises the steps of:

forming a second difference signal differing in phase from said first difference signal; and generating a second output signal from said second difference signal having a polarity dependent of the sense of the difference between the period of the input signal and the standard period.

5. Apparatus for determining the fractional difference in the period of an input signal from a standard period, the apparatus comprising:

a generator for generating a standard signal having said standard period;

an input terminal for receiving said input signal;

a frequency subtractor connected to said generator and to said input terminal for forming a difference signal the frequency of which is equal to the difference between the frequencies of said input and standard signals; and output-signal-generating means connected to said frequency subtractor for generating from said difference signal a signal which is the output signal comprising a pulse the duration of which is equal to a predetermined number of cycles of said input signal for each cycle of said difference signal.

6. Apparatus according to claim 5, wherein said output-signal-generating means comprises:

a delay device connected to said frequency-subtractor to delay said difference signal by said predetermined number of cycles of said input signal to provide a delayed signal; and a coincidence gate connected to said frequency-subtractor and said delay device for forming the output signal.

7. Apparatus according to claim 6, wherein said output-signal-generating means additionally comprises:

a second delay device connected in cascade with the first-mentioned delay device to provide a second delayed signal also delayed by a predetermined number of cycles of the input signal;

a second coincidence gate connected to said frequency-subtractor and to said second delay device for forming a second output signal; and means connected to the first and second delay devices to select a desired one of the output signals.

8. Apparatus according to claim 5, wherein said frequency-subtractor comprises a clocked bistable, which, in use, samples said standard signal once per cycle of said input signal and holds each sampled value until the next succeeding sample.

9. Apparatus according to claim 5, further comprising:
a second subtractor for forming a second difference signal differing in phase from said first difference signal; and
switching means for switching the output signal in accordance with the polarity of said second difference signal in such a manner that the sense of the fractional difference in the period of the input signal is indicated.

10. Apparatus according to claim 7, wherein said frequency subtractor comprises a clocked bistable which, in use, samples said standard signal once per cycle of said input signal and holds each sample value until the next succeeding sample; and including;
a second subtractor for forming a second difference signal differing in phase from said first difference signal; and
switching means for switching the output signal in accordance with the polarity of said second difference signal in such manner that the sense of the fractional difference in the period of the input signal is indicated.